Sept. 4, 1934.  H. S. EBERHARD  1,972,078
SEAL
Filed March 30, 1931
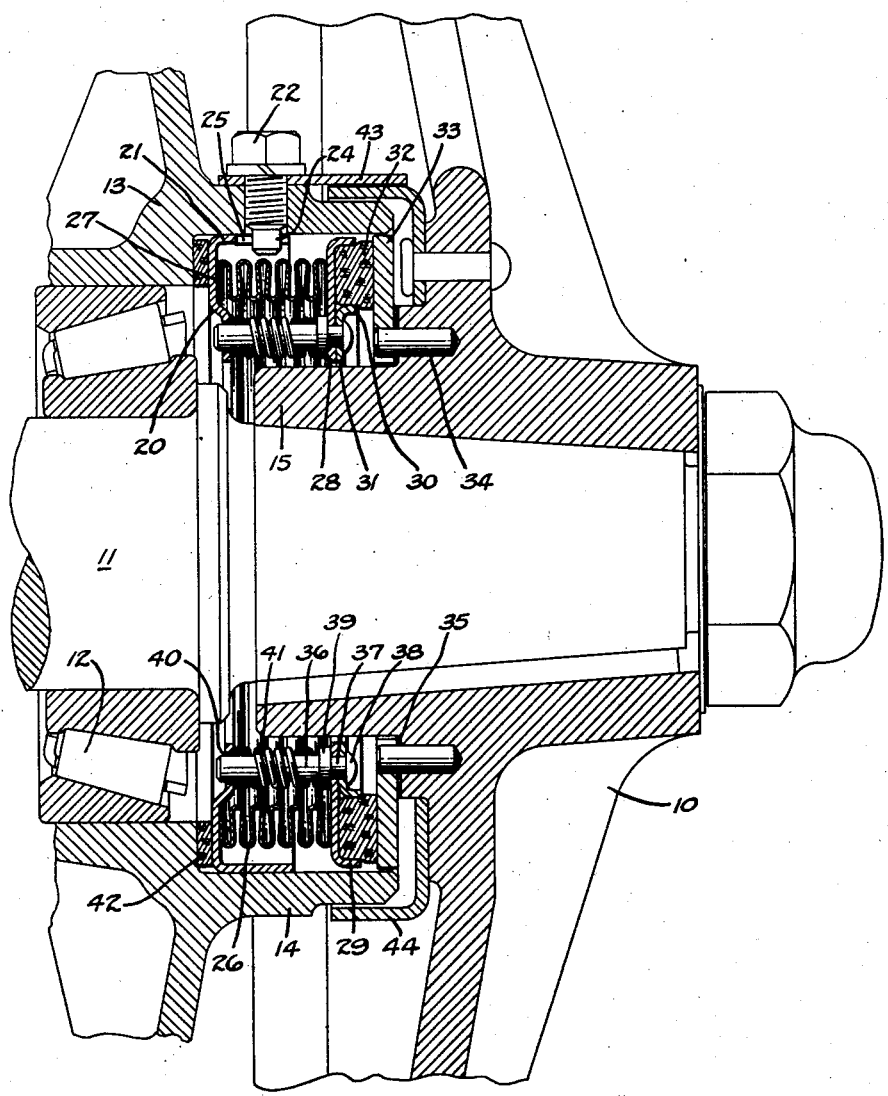
INVENTOR.
HARMON S. EBERHARD
BY
ATTORNEYS.

Patented Sept. 4, 1934

1,972,078

UNITED STATES PATENT OFFICE 1,972,078

SEAL

Harmon S. Eberhard, San Leandro, Calif., assignor to Caterpillar Tractor Co., San Leandro, Calif., a corporation of California Application March 30, 1931, Serial No. 526,303

20 Claims. (Cl. 286—11)

The invention relates to seals and particularly to seals for the wheel-bearings of vehicles.

For purposes of illustration the invention is shown as embodied in a seal for the driving sprocket of a track-type tractor.

Sprocket 10 is secured to shaft 11 which is supported in bearings 12 in housing 13 which is secured to the transmission case of the tractor. Housing 13 has an outwardly projecting annular flange 14 and sprocket 10 has an inwardly projecting hub portion 15. The seal is located between flange 14 and hub 15 and comprises an annular cupped plate member or shield 20 having a flange 21 which fits within annular flange 14 which is prevented from rotating therein by screw 22 having a portion 24 engaging in slot 25 in flange 21. A flexible metal bellows 26 is secured at 27 to shield 20. The other end of the bellows is secured to an annular ring 28 having a flange 29 which cooperates with a flange 30 on ring 31 to hold contact ring or collar 32 which is of a fibrous material or other packing material suitable for this purpose. Ring 28 thus serves as a backing plate for the ring or collar 32. Ring 32 contacts and rubs against a plate member which comprises metal washer or disc 33 which is secured by pins 34 to sprocket 10. A compressible washer 35 is placed under washer 33. Rings 28, 31 are secured together by means of a plurality of pins 36 having reduced end portions 37 inserted in aligned apertures in the rings and riveted over to form heads 38. The rings are retained between heads 38 and collars 39 on pins 36.

The other end of each pin 36 is loosely engaged in an aperture 40 in shield 20. A coil spring 41 on each pin seats against collar 39 and presses against shield 20 adjacent aperture 40. A compressible washer 42 is interposed between shield 20 and housing 13. Shield 20 is loosely mounted in housing or casing 13; and springs 41 tend to expand bellows 26 and maintain shield 20 against washer 42 against a shoulder formed in housing 13 and ring 32 against washer 33. In operation washer 33 being secured to rotating sprocket wheel 10 and the remaining portion of the seal being non-rotatably mounted with respect to housing 13, washer 33 is prevented from rotating ring 32 by pins 36 which prevent torsional strains from being transmitted to bellows 26.

Entrance to the seal is obstructed by over-lapping flanges 43, 44 secured to housing flange 14 and sprocket wheel 10, respectively. Any dirt passing these obstructions is prevented from entering the bearings by ring 32 pressing against washer 33, by the closed expansible bellows connection between ring 28 and shield 20, and by contact of the flange 21 of shield 20 with housing flange 14 and with washer 42 which it presses against housing 13.

The seal of my invention, which is positioned in a comparatively wide annular space formed between a stationary member and a member movable relative thereto, not only serves to prevent entrance of deleterious matter into said space, but serves also to prevent effectively leakage of lubricant. Inner cupped plate member 20 provides an inner, non-rotatable but axially-slidable pressure plate which is thrust by the annularly positioned springs 41 against one of the members forming the annular space; and the backing ring or plate 28 provides an outer pressure plate which is thrust by the springs against the other of said members which forms the annular space. Furthermore, backing plate 28 is adapted to receive evenly distributed pressure from the annularly positioned springs to maintain the packing ring or collar 32 in frictional sealing engagement with the rotatable sealing surface provided by annular member 33. Thus, a first line of defense is provided against entrance of foreign matter. As a second line of defense, the flexible sealing member or bellows 26 is in sealing engagement at one portion thereof, with backing plate 28; the opposite portion of the bellows 26 being maintained in sealing engagement with the stationary casing member 13. Pins 36 will be noted hold the backing plate 28 against rotation to enhance the efficacy of the seal.

I, therefore, claim as my invention:

1. In a tractor, a housing, a shaft therein, a wheel on said shaft, a seal, comprising a washer on said wheel, a ring to contact said washer, a pair of rings having concentric flanges to hold said contact ring, a shield associated with said casing, and means to connect said shield to said rings including a pin passing through aligned apertures in said shield and each of said pair of rings.

2. In a tractor, a housing having an annular flange, a wheel having a hub extending within said flange, and a seal between said flange and said hub comprising, a washer secured to said hub and extending substantially to said flange, a contact ring, a pair of flanged rings to support said contact ring, a shield seated within said flange, a bellows connected to said shield and one of said pair of rings, pins to secure said pair of rings together and to prevent rotation thereof with respect to said shield, and springs on said pins to press said contact ring against said washer.

3. A seal between a casing having an open end and an element projecting from the open end of the casing, comprising an annular member having a peripheral flange adapted to contact the casing and insertable through said open end of the casing, a second annular member spaced from the first-mentioned member and positioned adjacent said open end, means to maintain sealing relationship between said second annular member and a sealing surface supported by said element, and a flexible bellows between said members.

4. A seal between a casing having an open end and an element projecting from the open end of the casing, comprising a member loosely mounted within the casing and insertable through said open end, a second member spaced from the first-mentioned member and positioned adjacent said open end, means to maintain sealing relationship between said second annular member and a sealing surface supported by said element, tubular sealing means between said members to seal off passage therebetween, and a pin for maintaining said members in alignment.

5. A seal between a casing having an open end and a rotatable element projecting through said open end, comprising a plate member loosely mounted within the casing and insertable through said open end, means for constraining said plate member to movement axially of the axis of rotation of said rotatable element, a sealing member spaced from the plate member and adapted to be maintained in frictional contact with means rotatable with said element, a bellows connected with the plate member and the sealing member to seal off passage therebetween, and means connected between said plate member and said sealing member to hold the sealing member against rotation.

6. A seal between a casing having an open end and a rotatable element projecting through said open end, comprising a plate member loosely mounted within the casing and insertable through said open end, means for constraining said plate member to movement axially of the axis of rotation of said rotatable element, a sealing member spaced from the plate member and adapted to be maintained in frictional contact with a sealing surface rotatable with said element, a plurality of pins extending between said plate member and said sealing member to hold the sealing member against rotation, spring means interposed between said plate member and said sealing member to thrust them apart, and a flexible tubular member connected with said plate member and said sealing member to seal off passage therebetween.

7. Sealing means between a casing and a rotatable element extending therefrom, said casing having an open end and a shoulder portion spaced inwardly thereof, comprising a plate member adapted to be inserted through said open end of said casing and to bear against said shoulder, a sealing member spaced from the plate member and adapted to be maintained in frictional contact with a sealing surface rotatable with said element, means for holding the plate member against rotation, spring means interposed between said sealing member and said plate member to thrust the plate member against the shoulder and to maintain the sealing member in said frictional contact with said sealing surface, a plurality of pins connected with said sealing member and with said plate member to hold the sealing member against rotation, and tubular sealing means connected with said sealing member and said plate member to seal off passage therebetween.

8. Sealing means between a casing and a rotatable element extending therefrom, comprising a plate member rotatable with said element, a relatively thick sealing member adapted to be maintained in frictional contact with the plate member, a backing member for the sealing member, spring means bearing against the backing member to thrust the sealing member against the plate member, means for preventing rotation of the backing member including a pin extending from the backing member and substantially parallel to the axis of rotation of said element, and a flexible sealing member connected to the backing member and to said casing.

9. In a device of the class described, a casing having an open end and a shoulder portion spaced inwardly from said end, a rotatable element extending from said casing, and sealing means between the casing and the rotatable element, comprising a cupped-shaped sealing member loosely mounted within said casing and adapted to bear against said shoulder, a washer interposed between said cupped-shaped member and said shoulder, means for holding the cupped-shaped member against rotation but allowing axial movement thereof, a relatively thick sealing member adapted to abut means mounted for rotation with said rotatable element, a relatively thin backing plate secured to the sealing member, a plurality of pins each fixed to the backing plate and slidable through the cupped-shaped member, spring means surrounding said pins for thrusting apart the cupped-shaped member and the sealing member, and a flexible bellows connected with said cup-shaped member and said backing member to seal off passage therebetween.

10. A seal between a casing and an element rotatable therein, comprising a plate member mounted for rotation with said element; a sealing member adapted to be maintained in frictional contact with said plate member; means for preventing rotation of said sealing member, said means including a non-rotatable and slidably mounted plate member within the casing, and a plurality of pins, ends of which are fixedly secured to the sealing member and opposite ends of which are slidable in said non-rotatable plate member; and a spring about each pin and interposed between the sealing member and the non-rotatable plate member to thrust them apart.

11. A seal between a casing and an element rotatable therein, comprising a plate member mounted for rotation with said element; a sealing member adapted to be maintained in frictional contact with said plate member; means for preventing rotation of said sealing member, said means including a non-rotatable and slidably mounted plate member within the casing, and a plurality of pins, ends of which are fixedly secured to the sealing member and opposite ends of which are slidable in said non-rotatable plate member; a spring about each pin and interposed between the sealing member and the non-rotatable plate member to thrust them apart; and a flexible bellows connected with the sealing member and the non-rotatable plate member, said flexible bellows enclosing the springs and pins.

12. A seal structure between stationary means and rotatable means forming an annular space therebetween, comprising a two part device each part loosely mounted and slidable in said space, means cooperating with said stationary means and one of said parts to hold said one part against rotation, connecting means between said parts to prevent relative rotary movement therebetween, resilient means interposed between said parts to thrust one part against the stationary means and the other part against the rotatable means, and a flexible sealing member interconnected between said parts to seal off passage therebetween.

13. A seal structure between stationary means and rotatable means forming an annular space therebetween, comprising a two part device each part loosely mounted and slidable in said space, means cooperating with said stationary means and one of said parts to hold said one part against rotation, a plurality of pins on one of said parts and extending along the axis of rotation of said rotatable means, a spring about each of said mentioned pins and interposed between said parts to thrust one part against the stationary means and the other part against the rotatable means, and an annular flexible sealing member interconnected between said parts and surrounding said springs.

14. A seal structure between stationary means and rotatable means forming an annular space therebetween, comprising a sealing surface rotatable with said rotatable means, a packing adapted to be maintained in sealing contact with said surface, a backing member therefor and loosely mounted within said space, a second member loosely mounted within said space and adapted to abut said stationary means, a plurality of pins on one of said members and extending substantially parallel to the axis of rotation of said rotatable means, a spring about each of said mentioned pins and interposed between said members to thrust one member against the stationary means and the other member toward the rotatable means, means cooperating with said stationary means and one of said members to hold said one member against rotation, and an annular flexible sealing member interconnected between said members and surrounding said springs.

15. A sealing structure adapted to be inserted in an annular space formed between rotatable means and stationary means, said structure being adapted to fit loosely in said space and comprising, a packing member adapted to be maintained in sealing contact with a surface rotatable with said rotatable means, a backing member therefor, a second member adapted to be maintained in spaced relationship with respect to said backing member and adapted to abut said stationary means, means cooperating with said stationary means and one of said members to hold said one member against rotation, connecting means between said members to prevent relative rotary movement therebetween, resilient means interposed between said members to thrust one member against the stationary means and the other member toward the rotatable means, and annular flexible sealing means interconnected between said members to seal off passage therebetween.

16. A sealing structure adapted to be inserted in an annular space formed between rotatable means and stationary means, said structure being adapted to fit loosely in said space and comprising, a packing member adapted to be maintained in sealing contact with a surface rotatable with said rotatable means, a backing member therefor, a cup-shaped member adapted to be maintained in spaced relationship with respect to said backing member and adapted to abut said stationary means, means cooperating with said stationary means and said cup-shaped member to hold said cup-shaped member against rotation, a plurality of pins on one of said members and extending along the axis of rotation of said rotatable means, a spring about each of said mentioned pins and interposed between said members to thrust the cup-shaped member against the stationary means and the other member toward the rotatable means, and flexible annular sealing means interconnected between said members and surrounding said springs.

17. A seal structure between stationary means and rotatable means forming an annular space therebetween, comprising an annular sealing surface on said rotatable means, an annular packing member adapted to be maintained in frictional engagement with said sealing surface, a backing plate for said packing member adapted to provide a pressure surface against which spring means can bear to maintain said packing member in frictional engagement with said sealing surface, means for preventing rotary movement of said backing plate including a plurality of pins annularly positioned in said space, a plurality of springs annularly positioned in said space to apply even pressure distribution on said backing plate, an annular flexible member in said annular space and having sealing engagement at one portion with said backing plate, and means for effecting sealing engagement of another portion of said annular flexible member with said stationary means.

18. A seal structure between a stationary member and a tractor wheel rotatably mounted with the inner face of said wheel adjacent an end of said member, said wheel including a part in overlapping relationship with said member and forming with a wall of said member an annular space in which the seal structure is located; the seal structure comprising an annular sealing surface on the inner face of said wheel and adjacent said end of said stationary member, an annular packing member adapted to be maintained in frictional engagement with said sealing surface, a backing plate for said packing member adapted to provide a pressure surface against which spring means can bear to maintain said packing member in frictional engagement with said sealing surface, means for holding the backing plate against rotation, spring means in said annular space to apply even pressure distribution on said backing plate, an annular flexible member in said annular space and having sealing engagement at one portion with said backing plate, and means for effecting sealing engagement of another portion of said annular flexible member with said stationary member.

19. A seal structure between a stationary casing having an open end and a tractor wheel rotatably mounted adjacent said end by drive means extending through the casing and forming an annular space therebetween, comprising an annular sealing surface formed on means rotatable with said wheel and adjacent said open end of the casing, a plate member against which resilient means can bear to maintain another sealing surface in frictional engagement with said sealing surface rotatable with said wheel, a plurality of pins positioned in said annular space and engaging said plate member for holding said plate member against rotation, a plurality of springs annularly positioned in said space to apply even pressure distribution on said plate member and to thrust said plate member in a direction to maintain said sealing surfaces in sealing engagement, and additional sealing means including an annular flexible member in said annular space, said additional sealing means having sealing engagement at one portion thereof with said plate member and at another portion thereof with said casing.

20. A seal structure between a stationary casing having an open end and a tractor wheel rotatably mounted adjacent said end by drive means extending through the casing and forming an annular space therebetween, comprising an annular sealing surface formed on means rotatable with said wheel and adjacent said open end of the casing, annular plate means having an annular cup and providing a pressure surface against which resilient means can bear, a packing member seated in the annular cup of said plate means and adapted to engage frictionally said sealing surface rotatable with said wheel, means for holding said plate means against rotation, resilient means within said casing thrusting said plate means in a direction to maintain said sealing surface and said packing in sealing engagement, and additional sealing means including an annular flexible member in said annular space, said annular flexible member having sealing engagement at one portion thereof with said plate means and at another portion thereof with said casing.

HARMON S. EBERHARD.